United States Patent
Hartman et al.

(10) Patent No.: US 11,309,783 B2
(45) Date of Patent: Apr. 19, 2022

(54) ELECTROMAGNETIC PROPULSION SYSTEM

(71) Applicant: HONEYWELL FEDERAL MANUFACTURING & TECHNOLOGIES, LLC, Kansas City, MO (US)

(72) Inventors: Seth Hartman, Kansas City, MO (US); Erik Timpson, Kansas City, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 143 days.

(21) Appl. No.: 16/583,459

(22) Filed: Sep. 26, 2019

(65) Prior Publication Data
US 2021/0099066 A1    Apr. 1, 2021

(51) Int. Cl.
| | |
|---|---|
| *H02K 41/025* | (2006.01) |
| *B65G 23/23* | (2006.01) |
| *H02K 11/00* | (2016.01) |
| *H02K 7/09* | (2006.01) |
| *H02N 15/00* | (2006.01) |
| *H02K 7/00* | (2006.01) |
| *B61D 15/12* | (2006.01) |

(52) U.S. Cl.
CPC ........... *H02K 41/025* (2013.01); *B65G 23/23* (2013.01); *H02K 7/09* (2013.01); *H02K 11/0094* (2013.01); *B61D 15/12* (2013.01); *H02K 7/006* (2013.01); *H02N 15/00* (2013.01)

(58) Field of Classification Search
CPC ........ B61D 15/12; B65G 23/23; H02K 7/006; H02K 11/0094; H02K 41/00; H02K 41/02; H02K 41/025; H02N 15/00; H02P 2101/40

USPC .......... 310/12.09, 12.11, 12.14, 12.23, 12.24
See application file for complete search history.

(56) References Cited

U.S. PATENT DOCUMENTS

| | | | |
|---|---|---|---|
| 754,637 A * | 3/1904 | Birkeland ............. | H02K 41/02 124/3 |
| 3,135,879 A * | 6/1964 | Baumann ............. | H02K 41/025 310/13 |

(Continued)

FOREIGN PATENT DOCUMENTS

| | | |
|---|---|---|
| CN | 202209908 | 5/2012 |
| CN | 102927848 | 6/2014 |
| WO | WO2006088584 | 8/2006 |

*Primary Examiner* — Tulsidas G Patel
*Assistant Examiner* — Rashad H Johnson
(74) *Attorney, Agent, or Firm* — Hovey Williams LLP

(57) ABSTRACT

An electromagnetic propulsion system comprises a plurality of stator coils wound about a first axis, a plurality of support structures, a coupler that surrounds a portion of the stator coils, and a plurality of rotor coils wound about an axis that is parallel to the first axis. The stator coils are configured to receive electric current to induce a first magnetic field. The support structures support the stator coils. The coupler includes a notch oriented so that one of the support structures can pass through the notch when the coupler moves along the stator coils. The rotor coils are attached to the coupler and are configured to receive electric current to induce a magnetic field that interacts with the first magnetic field so that a magnetic force is applied to the rotor coils, thereby propelling the coupler and the rotor coils along the stator coils.

19 Claims, 5 Drawing Sheets

(56) References Cited

U.S. PATENT DOCUMENTS

| | | | |
|---|---|---|---|
| 3,426,887 A * | 2/1969 | Davey | B65G 23/00 198/619 |
| 3,585,939 A * | 6/1971 | Laithwaite | H02K 41/025 104/291 |
| 3,616,978 A * | 11/1971 | Haslam | B65G 54/02 226/93 |
| 3,987,321 A * | 10/1976 | Wilhelmi | H02K 41/025 310/13 |
| 4,197,488 A * | 4/1980 | Kant | H02K 37/04 310/12.14 |
| 4,281,263 A * | 7/1981 | Virolleau | B22D 11/122 310/13 |
| 4,432,333 A * | 2/1984 | Kurherr | F41B 6/00 124/3 |
| 4,439,702 A * | 3/1984 | Belikov | H02K 41/02 310/12.14 |
| 4,709,883 A | 12/1987 | Giuliani et al. | |
| 5,203,432 A * | 4/1993 | Grinaski | B66B 11/0055 187/251 |
| 5,270,593 A * | 12/1993 | Levi | B60L 13/10 104/282 |
| 5,586,504 A * | 12/1996 | He | B60L 13/04 104/282 |
| 5,783,877 A * | 7/1998 | Chitayat | H02K 41/03 310/12.33 |
| 5,950,543 A | 9/1999 | Oster | |
| 5,959,415 A * | 9/1999 | Sedgewick | H02K 41/031 318/135 |
| 6,696,775 B2 | 2/2004 | Engel | |
| 6,897,595 B1 * | 5/2005 | Chiarenza | H02K 21/145 310/156.53 |
| 7,013,988 B2 | 3/2006 | Westmeyer et al. | |
| 7,077,046 B2 * | 7/2006 | Nelyubin | F41B 6/003 124/3 |
| 7,614,393 B1 | 11/2009 | Lu | |
| 7,847,442 B2 * | 12/2010 | Rohner | H02K 41/031 310/12.14 |
| 8,008,814 B2 * | 8/2011 | Ida | H02K 41/03 310/12.21 |
| 8,459,519 B2 | 6/2013 | Feng et al. | |
| 9,580,188 B2 | 2/2017 | Endres | |
| 10,491,093 B2 * | 11/2019 | Hadziristic | H02K 41/025 |
| 2002/0047314 A1 * | 4/2002 | Takedomi | H02K 41/03 310/12.23 |
| 2003/0025403 A1 * | 2/2003 | Hsiao | H02K 41/03 310/12.14 |
| 2005/0155487 A1 | 7/2005 | Frasca | |
| 2006/0033393 A1 * | 2/2006 | Ritchey | H02K 7/108 310/112 |
| 2006/0091732 A1 * | 5/2006 | Onishi | H02K 41/03 310/12.23 |
| 2007/0152513 A1 * | 7/2007 | Shikayama | H02K 41/03 310/12.23 |
| 2007/0257564 A1 * | 11/2007 | Kitade | H02K 41/03 310/12.23 |
| 2008/0088200 A1 * | 4/2008 | Ritchey | H02K 16/00 310/268 |
| 2008/0265687 A1 * | 10/2008 | Chang | H02K 7/06 310/24 |
| 2009/0195127 A1 * | 8/2009 | Lin | H02K 1/146 310/75 C |
| 2010/0156205 A1 * | 6/2010 | Davis | H02P 25/0925 310/46 |
| 2011/0042521 A1 | 2/2011 | Sample | |
| 2011/0181129 A1 * | 7/2011 | Aso | H02K 21/14 310/12.14 |
| 2011/0291496 A1 * | 12/2011 | Bobelis | H02K 5/10 310/12.23 |
| 2012/0193179 A1 * | 8/2012 | Gysen | B60G 11/00 188/267 |
| 2015/0008768 A1 * | 1/2015 | Achterberg | B65G 54/02 310/12.11 |
| 2016/0359402 A1 * | 12/2016 | Makino | H02K 15/02 |
| 2017/0025927 A1 * | 1/2017 | Weerts | H02K 21/24 |
| 2017/0343314 A1 | 11/2017 | Hartman et al. | |
| 2017/0346378 A1 * | 11/2017 | Hartman | H02K 41/031 |
| 2017/0366078 A1 * | 12/2017 | Zhang | H02K 1/00 |
| 2017/0373552 A1 * | 12/2017 | Piech | B66B 11/0407 |
| 2017/0373579 A1 * | 12/2017 | Goncalves | H02K 9/22 |
| 2018/0145570 A1 * | 5/2018 | Wang | H02K 41/025 |
| 2019/0140531 A1 * | 5/2019 | Kelly | H02K 3/04 |
| 2019/0214896 A1 * | 7/2019 | Rauma | H02K 3/04 |
| 2020/0195096 A1 * | 6/2020 | Loesch | H02K 1/12 |
| 2021/0039512 A1 * | 2/2021 | Chang | B60L 53/122 |

* cited by examiner

ELECTROMAGNETIC PROPULSION SYSTEM

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Electromagnetic propulsion systems are used for accelerating projectiles or objects using magnetic forces. Existing electromagnetic propulsion systems often use an elongated stator having helical stator coils to form a tube. A current is supplied to the stator coils to induce a magnetic field inside the stator along the length of the stator. The magnetic field causes a magnetic force to propel a rotor situated inside the stator coils. The rotor may be a piece of metal, a magnet, or an electromagnet that interacts with the magnetic force. Sometimes it is desired to propel an object external to the stator.

Therefore, some electromagnetic launchers employ a rotor having coils that completely surround the stator so that the magnetic fields of the stator coils and rotor coils efficiently react to one another. However, such a configuration is limited in applications where a stator length is long as great lengths of the stator must be supported at each end.

The background discussion is intended to provide information related to the present invention which is not necessarily prior art.

SUMMARY

The present invention solves the above-described problems and other problems by providing a distinct advance in the art of electromagnetic propulsion systems. More particularly, the present invention provides an electromagnetic propulsion system having a rotor, a stator, and a stator support configuration that enables the stator to extend any length and define any path.

The electromagnetic propulsion system of the present invention broadly includes a first plurality of stator coils, a plurality of support structures, a first coupler, and a first plurality of rotor coils. The stator coils are wound about a first axis and are configured to receive electric current to induce a first magnetic field. The support structures support the stator coils.

The first coupler surrounds a portion of the stator coils and has a notch oriented so that one or more of the support structures can pass through the notch when the first coupler moves along the stator coils. The rotor coils are wound about an axis that is parallel to the first axis and are attached to the first coupler. The rotor coils are configured to receive electric current to induce a magnetic field that interacts with the first magnetic field so that a magnetic force is applied to the rotor coils, thereby propelling the first coupler and the rotor coils along the stator coils. Because the rotor coils are wound about an axis external to the stator coils, the coupler is able to have the notch which allows it to pass by the support structures. Therefore, the stator can be supported by the support structures along any point in its length, which allows the stator to extend for any length and follow any path.

The above-described electromagnetic propulsion system may also comprise a second plurality of stator coils, a second coupler, a second plurality of rotor coils, and a chassis. The second plurality of stator coils are wound about a second axis and are also supported by the support structures. The second plurality of stator coils are configured to receive electric current to induce a second magnetic field. The second coupler surrounds a portion of the second plurality of stator coils so that the second coupler is movable along the second plurality of stator coils. The second coupler also has a notch oriented so that one of the support structures can pass through the notch when the second coupler moves along the second plurality of stator coils. The second plurality of rotor coils are wound about an axis that is parallel to the second axis and are attached to the second coupler. The second plurality of rotor coils are configured to receive electric current to induce a magnetic field that interacts with the second magnetic field so that a magnetic force is applied to the second plurality of rotor coils, thereby propelling the second coupler.

The chassis is connected to the first coupler and the second coupler so that the chassis is movable along the stator coils. When the magnetic fields of the stator coils interact with the respective magnetic fields of the rotor coils, magnetic forces are applied to the rotor coils which then propel the couplers and therefore the chassis.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
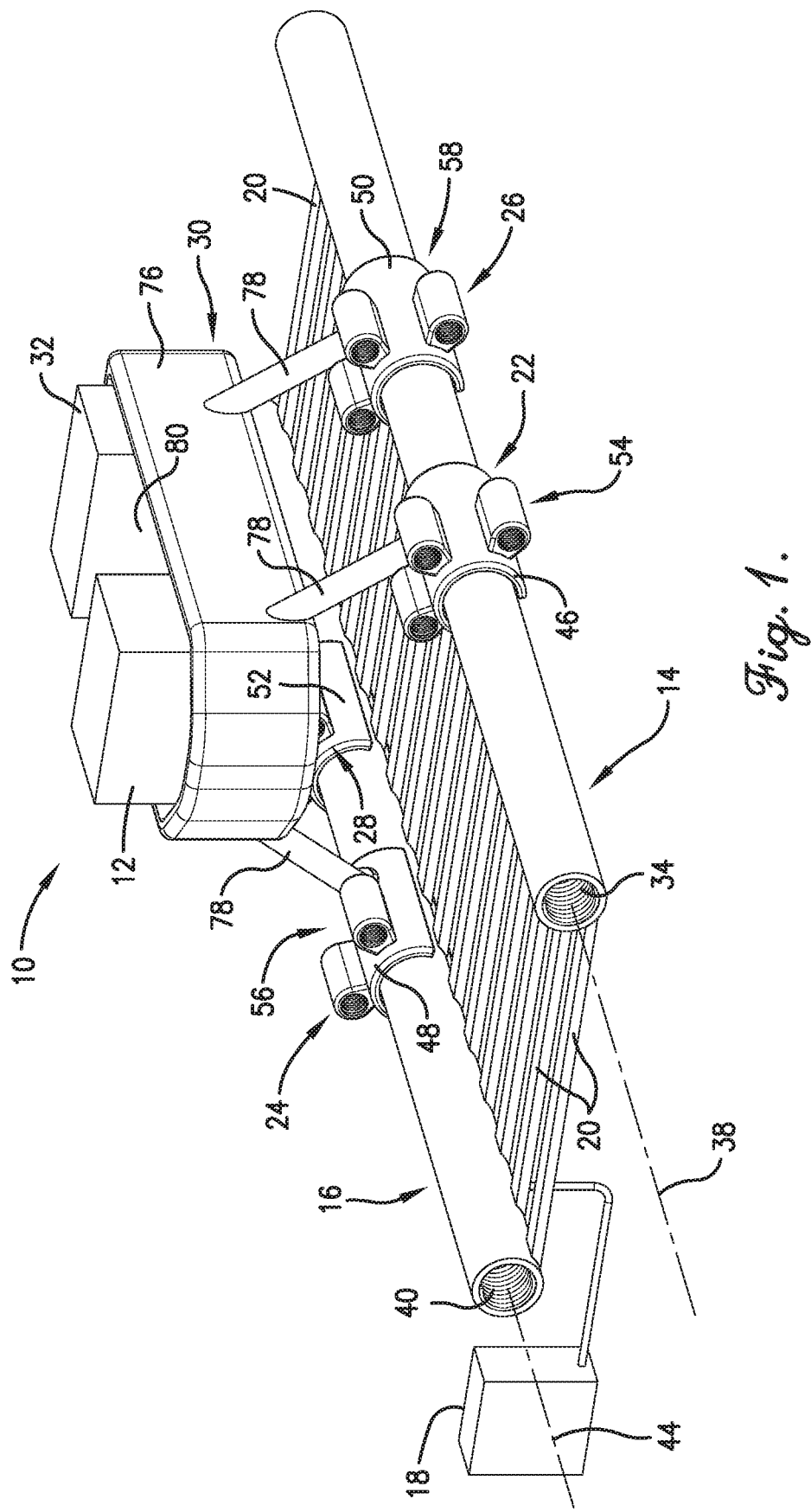
FIG. 1 is perspective view of an electromagnetic propulsion system constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an electromagnetic propulsion system 10 constructed in accordance with an embodiment of the present invention is illustrated. The propulsion system 10 may be implemented for various applications, including for launching projectiles or transporting loads 12, such as objects or people. The propulsion system 10 converts electric power into physical actuation and broadly comprises a pair of stators 14, 16, a stator power source 18, a plurality of support structures 20, a plurality of rotors 22, 24, 26, 28, a chassis 30, and a rotor power source 32.

Figure 2:
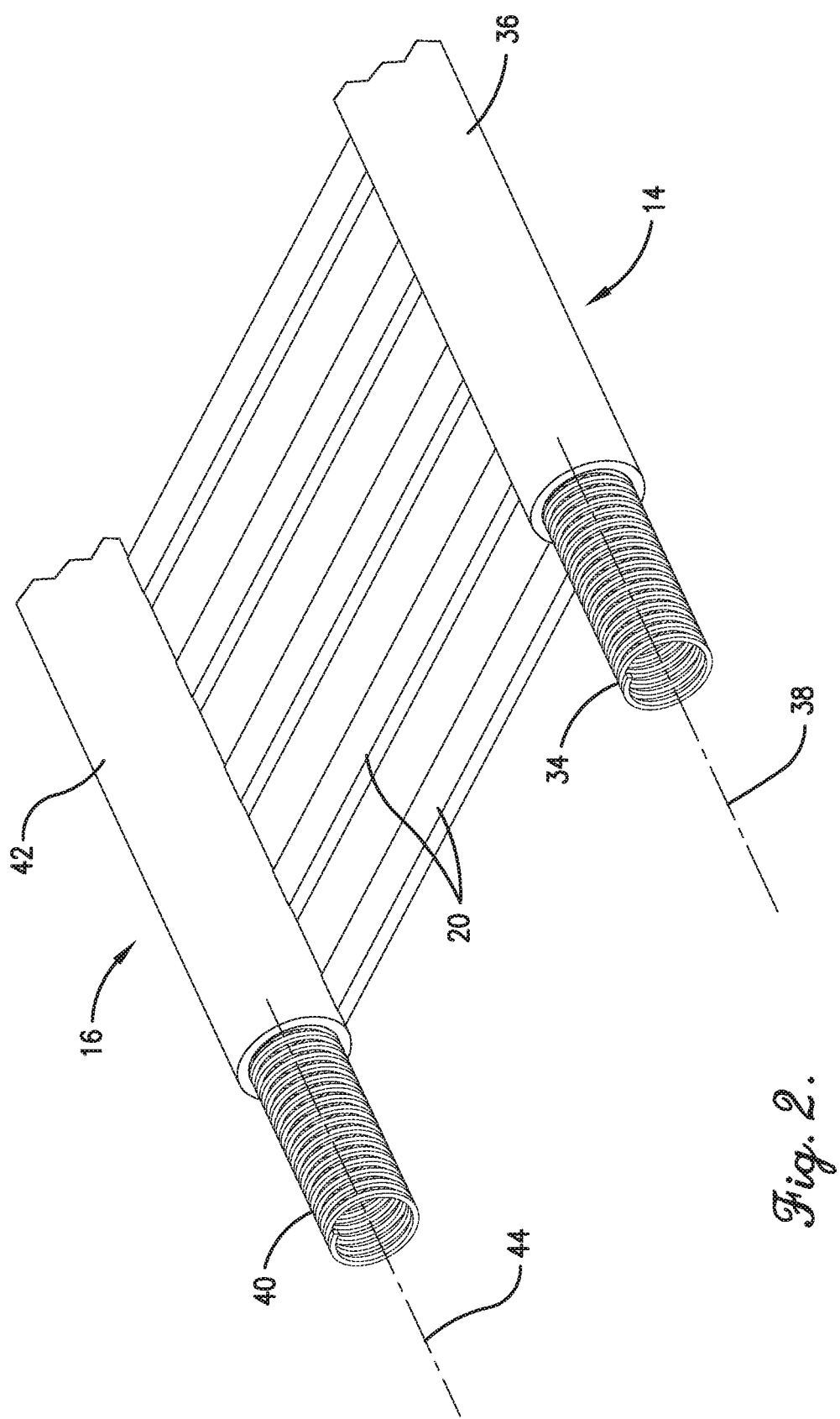
FIG. 2 is a perspective view of the stators of the electromagnetic propulsion system of FIG. 1.

Turning to FIG. 2, the stators 14, 16 generate magnetic fields that interact with magnetic fields of the rotors 22, 24, 26, 28 to propel the chassis 30 along the path of the stators 14, 16. The first stator 14 may include a first plurality of stator coils 34 and a first stator housing 36. The first plurality of stator coils 34 are helically wound about a first axis 38 to form a cylindrical shape. However, the first plurality of stator coils 34 may form any shape and alternatively or additionally comprise a plurality of singular, semi-circular (or other shapes) stator coils without departing from the scope of the present invention. The first plurality of stator coils 34 may be made of metal, alloys, conductive carbon-fiber material, or any other conductive material. The first plurality of stator coils 34 are configured to receive electric current from the stator power source 18 so that the current generates a first magnetic field around the first plurality of stator coils 34.

For example, the first plurality of stator coils 34 may be selectively activated based on the location of the rotors 22, 26 so that the first magnetic field attracts and/or repels the rotors 22, 26. Specifically, a group of stator coils 34 proximate to the rotors 22, 26 may be selectively activated to attract the rotors 22, 26 toward the group of stator coils 34 in order to move the rotors 22, 26 toward the group of stator coils 34. The activated group of stator coils 34 may be operable to stay ahead of the rotors 22, 26 in order to accelerate or maintain a velocity of the chassis 30. Alternatively or additionally, a group of stator coils 34 proximate to the rotors 22, 26 may be selectively activated to repel the rotors 22, 26 away from the group of stator coils 34 in order to move the rotors 22, 26 away from the group of stator coils 34. The activated group of stator coils 34 may stay behind the rotors 22, 26 in order to accelerate or maintain a velocity of the chassis 30. To decelerate the chassis 30, the activated group of stator coils 34 may be operable to have their relative polarities switched in order to apply a magnetic force in the opposite direction of the movement of the rotors 22, 26 while maintaining the activated group of stator coils' 34 proximity to the rotors 22, 26.

The first stator housing 36 supports the first plurality of stator coils 34. The first plurality of stator coils 34 may be attached to the inner and/or outer surface of the first stator housing 36. The first stator housing 36 may also surround and/or envelop the first plurality of stator coils 34 so that the first plurality of stator coils 34 are embedded within the first stator housing 36. The first stator housing 36 may be made of non-conductive material, such as concrete, to prevent shorts in the coils 34. However, the first stator coils 34 may be insulated, such as with rubber or the like, and the first stator housing 36 may include metal or other conductive materials without departing from the scope of the present invention.

The second stator 16 may include a second plurality of stator coils 40 and a second stator housing 42. The second plurality of stator coils 40 are helically wound about a second axis 44 to form a cylindrical shape. The second axis 44 may be parallel to the first axis 38. The second plurality of stator coils 40 may form any shape and alternatively or additionally comprise a plurality of singular, semi-circular (or other shapes) stator coils without departing from the scope of the present invention. The second plurality of stator coils 40 may also be made of metal, alloys, conductive carbon-fiber material, or any other conductive material. The second plurality of stator coils 40 are configured to receive electric current from the stator power source 18 so that the current generates a second magnetic field around the second plurality of stator coils 40.

For example, the second plurality of stator coils 40 may be selectively activated based on the location of the rotors 24, 28 so that the second magnetic field attracts and/or repels the rotors 24, 28. Specifically, a group of stator coils 40 proximate to the rotors 24, 28 may be selectively activated to attract the rotors 24, 28 toward the group of stator coils 40 in order to move the rotors 24, 28 toward the activated group of stator coils 40. The activated group of stator coils 40 may be operable to stay ahead of the rotors 24, 28 in order to accelerate or maintain a velocity of the chassis 30. Alternatively or additionally, a group of stator coils 40 proximate to the rotors 24, 28 may be selectively activated to repel the rotors 24, 28 away from the group of stator coils 40 in order to move the rotors 24, 28 away from the group of stator coils 40. The activated group of stator coils 40 may stay behind the rotors 24, 28 in order to accelerate or maintain a velocity of the chassis 30. To decelerate the chassis 30, the activated group of stator coils 40 may be operable to have their relative polarities switched in order to apply a magnetic force in the opposite direction of the movement of the rotors 24, 28 while maintaining the activated group of stator coils' 40 proximity to the rotors 24, 28.

The second stator housing 42 supports the second plurality of stator coils 40. The second plurality of stator coils 40 may be attached to the inner and/or outer surface of the second stator housing 42. The second stator housing 42 may also surround and/or envelop the second plurality of stator coils 40 so that the second plurality of stator coils 40 are embedded within the second stator housing 42. The second stator housing 42 may be made of non-conductive material, such as concrete, to prevent shorts in the coils 40. However, the second stator coils 40 may be insulated, such as with rubber or the like, and the second stator housing 42 may include metal or other conductive materials without departing from the scope of the present invention. While FIGS. 1 and 2 depict the system 10 having two stators 14, 16, the system 10 may have any number of stators (including one, three, or more) without departing from the scope of the present invention.

The stator power source 18 provides electric current to the stator coils 34, 40 of the stators 14, 16. The electric current may be direct current or alternating current. The connection between the stator power source 18 and the stator coils 34, 40 may be any configuration so that the magnetic fields of the stator coils 34, 40 and the rotors 22, 24, 26, 28 cooperatively apply magnetic forces to the rotors 22, 24, 26, 28. For example, the power source 18 may selectively power any number of coils 34, 40. The stator power source 18 may be a battery, a generator, a converter, a bus, or the like.

The support structures 20 are connected to and support the stators 14, 16. The support structures 20 may be connected to the stator housings 36, 42 and extend between the stators 14, 16, similar to train tracks. However, the support structures 20 may have any shape and be connected to the stators 14, 16 at any angle without departing from the scope of the present invention. For example, it is foreseen that the support structures 20 may connect to a bottom surface of the stators 14, 16 and extend vertically. Alternatively, the support structures 20 may be connected to the stators 14, 16 at an angle to form v-shaped structures. The support structures 20 may be made of any structurally-rigid material, such as concrete, metal, alloys, carbon fiber-reinforced material, or the like.

The rotors 22, 24, 26, 28 are attached to the chassis 30 and are coupled to the stators 14, 16 and configured to interact with the magnetic fields of the stators 14, 16 to propel the chassis 30. The rotors 22, 24, 26, 28 may support the chassis 30 or merely be configured to propel the chassis 30. Rotor 22 and rotor 26 may be positioned coaxially on the same stator 14, and rotor 24 and rotor 28 may be positioned coaxially on the same stator 16. Each rotor 22, 24, 26, 28 includes a coupler 46, 48, 50, 52 and groups of rotor sets 54, 56, 58, 60. While the system 10 is described as having two pairs of coaxial rotors 22, 24, 26, 28, the system 10 may include any number of rotors (including one or more) without departing from the scope of the present invention. Additionally, the system 10 may have any number of rotors on each stator without departing from the scope of the present invention.

Figure 3:
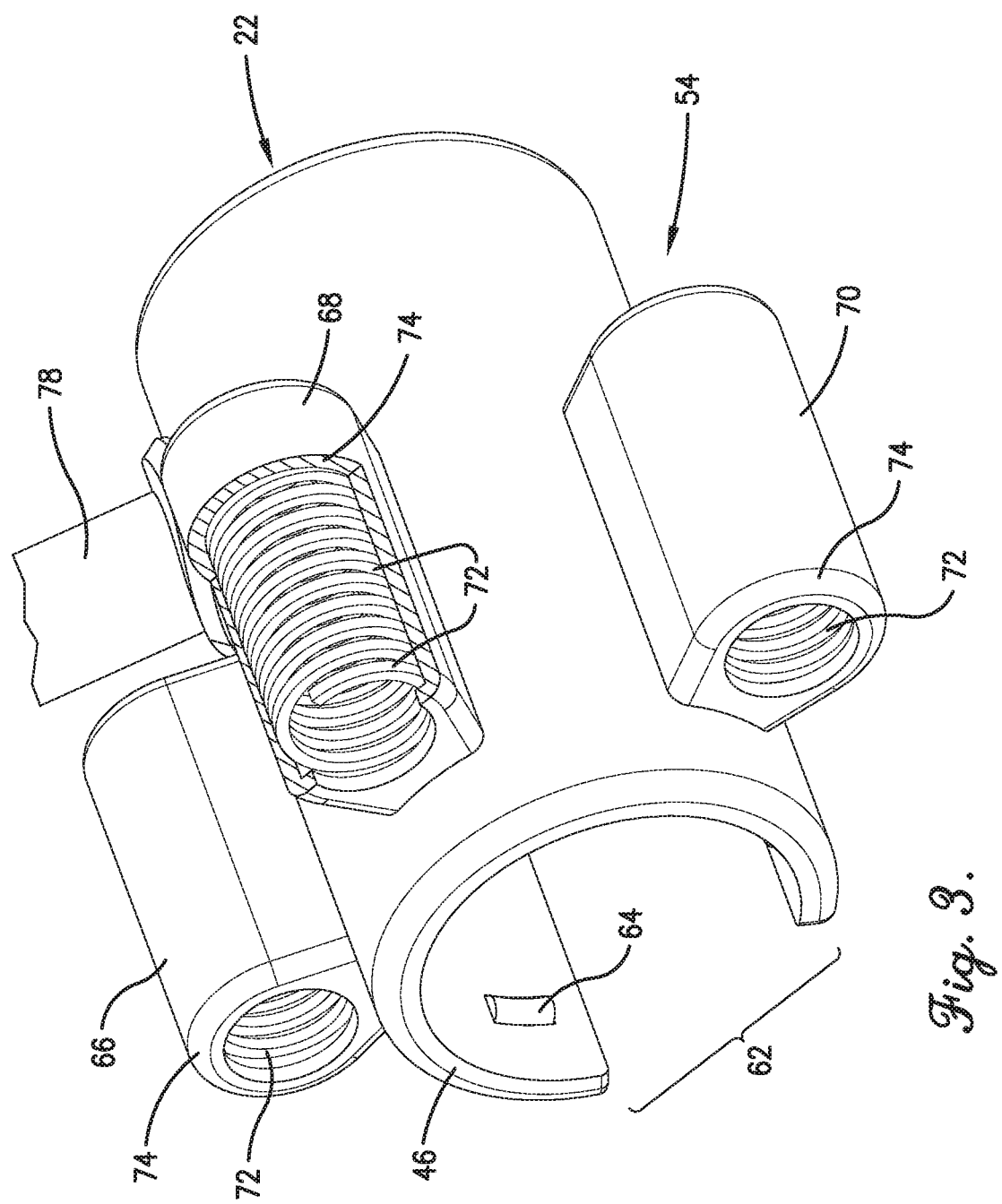
FIG. 3 is an elevated perspective view of a rotor of the electromagnetic propulsion system of FIG. 1.
Figure 4:
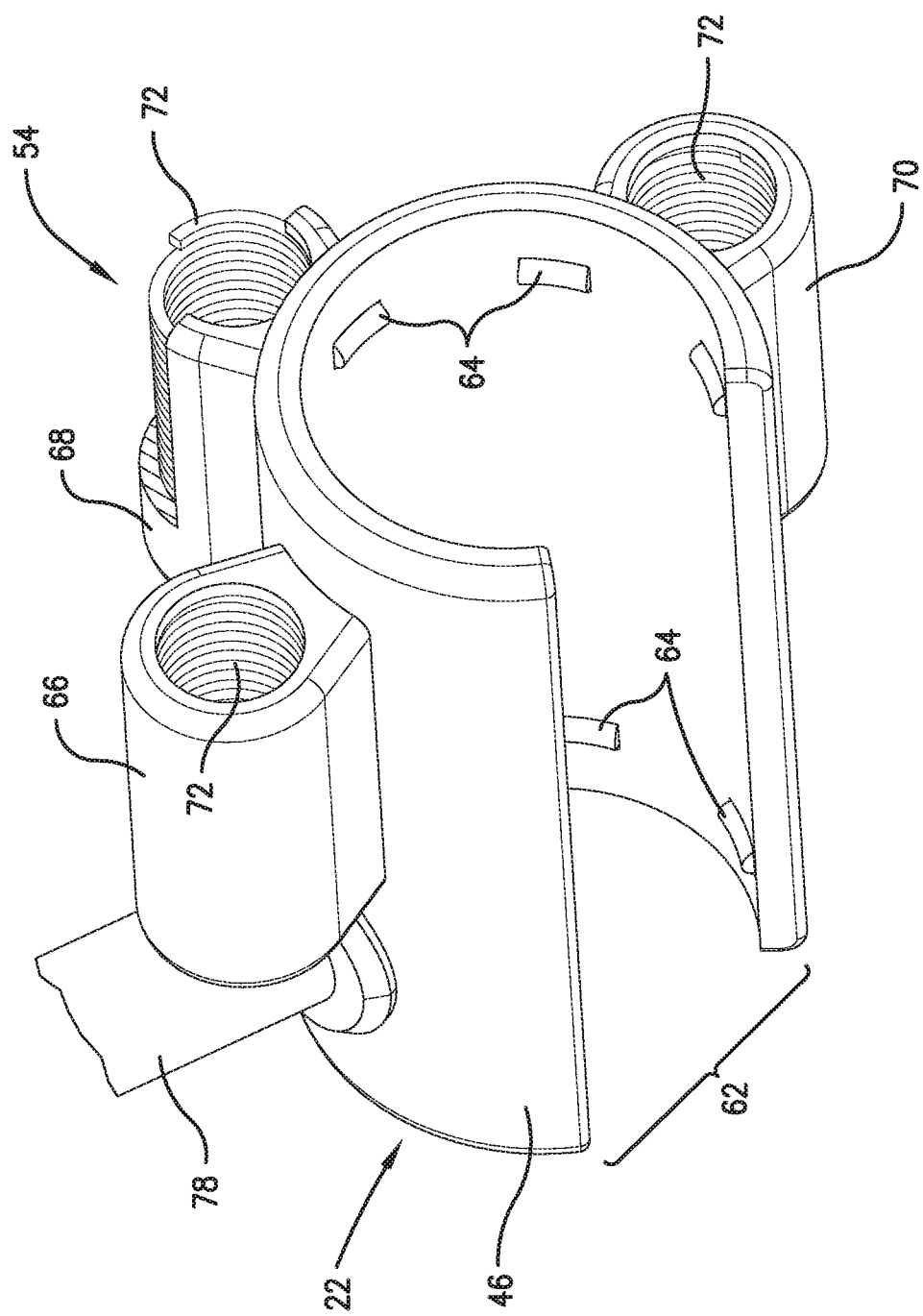
FIG. 4 is a lowered side perspective view of the rotor of FIG. 3.
Figure 5:
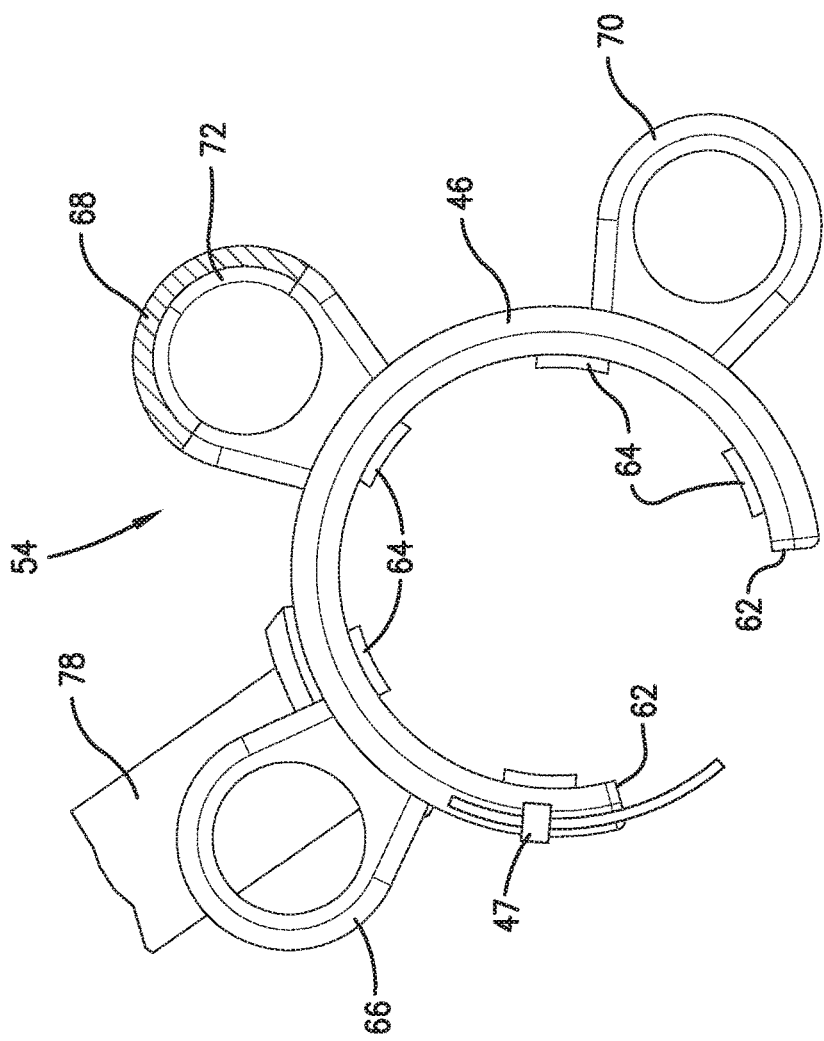
FIG. 5 is a front perspective view of a set of the rotor of FIG. 3.

Turning to FIGS. 3-5, only one rotor 22 is depicted as representing the other rotors 24, 26, 28, which are substantially similar to rotor 22, to avoid cumulative descriptions. The coupler 46 of rotor 22 substantially surrounds the stator 14 and is operable to move along the stator 14. The coupler 46 includes a notch 62 that allows the one or more of the support structures 20 to pass therethrough when the coupler 46 moves along the stator 14. The coupler 46 may be penannular and form a c-shape or any other shape that partially surrounds the stator 14. The notch 62 may be located at any radial position on the coupler 46, i.e. the coupler 46 may be rotated at any angle relative to the stator 14, without departing from the scope of the present invention. The notch 62 may be larger or smaller than a diameter of the stator 14. In embodiments where the notch 62 is smaller than the diameter of the stator 14, the coupler 46 acts as a failsafe in that the rotor 22 and therefore the load 12 will not depart from the stator 14 absent catastrophic failure. Embodiments in which the notch 62 is larger than the diameter of the stator 14 allow for easy removal and coupling of the rotor 22 from and to the stator 14. In some embodiments, the coupler 46 may include a locking mechanism 47 that adjusts the size of the notch 62, as shown in FIG. 5.

The system 10 may include a bearing system 64 between the coupler 46 and the stator 14. The bearing system 64 may include one or more bearings or magnets configured to reduce the friction between the coupler 46 and the stator 14. The bearing system 64 may be installed on the stator 14 and/or the coupler 46.

The group of rotor sets 54 may include any number of rotor coils. Three sets of rotor coils 66, 68, 70 are depicted. The sets of rotor coils 66, 68, 70 may be attached to the coupler 46 and positioned anywhere on the coupler 46. The sets of rotor coils 66, 68, 70 may be radially spaced on the coupler 46 so that they are equidistant from each other. The group of rotor sets 54 may include any number of sets of rotor coils 66, 68, 70 without departing from the scope of the present invention. For example, each rotor 22 may include only one set of rotor coils.

Each set of rotor coils 66, 68, 70 may include a plurality of rotor coils 72 and a rotor housing 74. The rotor coils 72 are configured to receive electric current to induce a magnetic field that interacts with the magnetic field of the stator 14. The interaction of the magnetic fields causes a magnetic force to be applied to the rotor coils 72 which in turn pushes the coupler 46, which pushes the chassis 30. The rotor coils 72 may be helically wound about an axis parallel to the first axis 38. By positioning the rotor coils 72 outside the stator 14 instead of inside the stator 14 or surrounding the stator 14, the coupler 46 is able to have the notch 62 which allows the stator 14 to be supported by the support structures 20. This allows the stator 14 to be any length and define any path. The direction of the winding of the coils 72 does not matter so long as the magnetic field induced by the current going through the coils 72 is consistent among the sets of rotor coils 66, 68, 70. The rotor coils 72 may alternatively or additionally comprise a plurality of singular, semi-circular (or other shapes) rotor coils without departing from the scope of the present invention. The rotor coils 72 may also be made of metal, alloys, conductive carbon-fiber material, or any other conductive material. In some embodiments, the rotor coils 72 comprise superconductor material that are cryogenically cooled.

The rotor housing 74 supports the rotor coils 72. The rotor coils 72 may be attached to the inner or outer surface of the rotor housing 74. The rotor housing 74 may also surround and/or envelop the rotor coils 72 so that the rotor coils 72 are embedded within the rotor housing 74. The rotor housing 74 may be made of non-conductive material, such as plastic or other material, to prevent shorts in the rotor coils 72. However, the rotor coils 72 may be insulated, such as with rubber or the like, and the rotor housing 74 may include metal or other conductive materials without departing from the scope of the present invention.

Turning back to FIG. 1, the chassis 30 supports the load 12 and the rotor power source 32 and is connected to and/or supported by the rotors 22, 24, 26, 28. The chassis 30 may include a body 76 and a plurality of rotor connectors 78. The body 76 may include a cabin 80 for storing the load 12 and/or the rotor power source 32. The rotor connectors 78 connect the rotors 22, 24, 26, 28 to the chassis 30.

The rotor power source 32 may include a battery, capacitor bank, generator, or any other electric power storage and/or generation system. The rotor power source 32 is operable to provide electric current to the rotors 22, 24, 26, 28 so that their rotor coils 72 can generate magnetic fields that interact with the magnetic fields of the stators 14, 16. In some embodiments, the couplers 46, 48, 50, 52 may be configured to pass power to the stators 14, 16 from the power source 32 using sliding electrical contacts, such as contacts 64, to energize an optimal section of the stators 14, 16 as the couplers 46, 48, 50, 52 move along the stators 14, 16. Such embodiments would provide the highest coupling of the fields generated on the stators 14, 16 to the field from the rotor coils 72. In some embodiments, the rotors 22, 24, 26, 28 may receive electric current from stator coils 34, 40. For example, the stator coils 34, 40 may be wound about the stator housings 36, 42, and the bearing system 64 may comprise conductive bearings that contact the stator coils 34, 40, so that electric current is passed to the bearings. The conductive bearings of the bearing system 64 may be in electrical communication with the rotor coils 72 so that the current passes from the bearings to the rotor coils 72. The bearing system 64, stator coils 34, 40, and the rotor coils 72 may have any electrical configuration so long as the magnetic field induced in the coils 34, 40, 72 causes the rotors 22, 24, 26, 28 to be subject to a force. For example, each end of the rotor coils 72 may be connected to a different conductive bearing and/or the rotor coils 72 may be grounded elsewhere, such as at the rotor power source 32.

Figure 6:
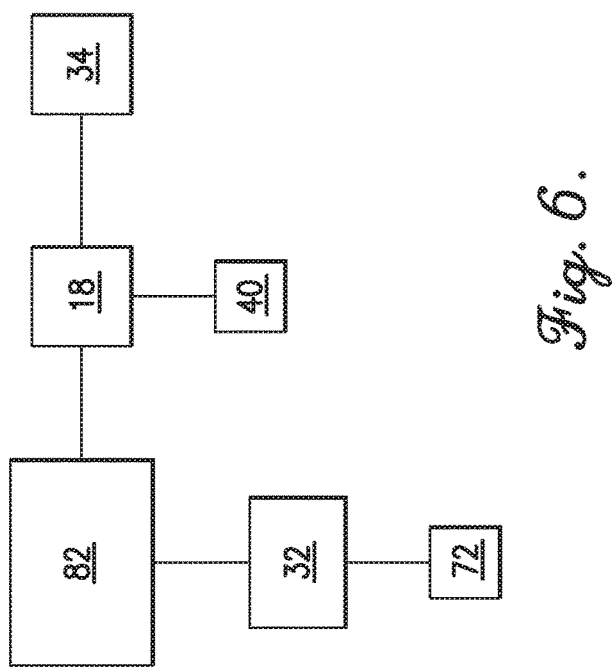
FIG. 6 is a schematic view of a control system of the electromagnetic propulsion system of FIG. 1.

Turning to FIG. 6, the electromagnetic system may include a control system 82 configured to control an amount of current delivered to the stator coils 34, 40 of the stators 14, 16 and/or rotor coils 72 of the rotors 22, 24, 26, 28. The control system 82 may also be configured to control a direction of the movement of, or the force applied to, the rotors 22, 24, 26, 28 and chassis 30. The control system 82 may be in communication with the stator power source 18 and/or the rotor power source 32. For example, the control system 82 may be configured to increase or decrease an amount of current supplied to the stator coils 34, 40 of one or more of the stators 14, 16 and/or to the rotor coils 72 of one or more of the rotors 22, 24, 26, 28 to increase or decrease the magnetic force resulting therefrom to cause the chassis 30 to accelerate or decelerate. The control system 82 may be configured to switch the direction of the current supplied to the stators 14, 16 and/or rotors 22, 24, 26, 28 in order to decelerate and/or reverse the direction of the rotors 22, 24, 26, 28 and chassis 30.

The control system 82 may comprise any number or combination of controllers, sensors, circuits, integrated circuits, programmable logic devices such as programmable logic controllers (PLC) or motion programmable logic controllers (HPLC), computers, processors, microcontrollers, transmitters, receivers, amplifiers, other electrical and computing devices, and/or residential or external memory for storing data and other information accessed and/or generated by the electromagnetic propulsion system 10.

The control system 82 may control and/or sense operational sequences, power, speed, motion, or movement of the rotors 22, 24, 26, 28 and/or the chassis 30. Portions of the control system 82 may be positioned on the chassis 30, rotors 22, 24, 26, 28, and/or stators 14, 16, including switches, controllers, sensors, transceivers, etc. For example, switches may be physically located on the stators 14, 16, the chassis 30, and/or the rotors 22, 24, 26, 28 and could supply power to the stators 14, 16 and/or the rotors 22, 24, 26, 28 when directed to by the control system 82. The switches could also be in a multiplexor consisting of silicon-controlled rectifiers (SCRs), connected to the stators 14, 16 and/or rotors 22, 24, 26, 28.

In use, the stator power source 18 supplies electric current to the stator coils 34, 40 of the stators 14, 16. The current traveling through the stator coils 34, 40 generates a magnetic field about the stators 14, 16. To accelerate the chassis 30, the rotor power source 32 may supply electric current to the rotor coils 72 of the rotors 22, 24, 26, 28. The electric current traveling through the rotor coils 72 induces magnetic fields about the sets of rotor coils 66, 68, 70. The magnetic fields generated by the sets of rotor coils 66, 68, 70 interact with the magnetic fields of the stators 14, 16 thereby causing magnetic forces to be applied to the sets of rotor coils 66, 68, 70. The magnetic forces push the sets of rotor coils 66, 68, 70, which then push their respective coupler 46, 48, 50, 52. The couplers 46, 48, 50, 52 thereby accelerate the chassis 30 along the stators 14, 16. The stator power source 18 and/or the rotor power source 32 may adjust the current to their respective coils 34, 40, 72 in order to affect the magnitude of the magnetic force and thereby affect the velocity of the chassis 30.

For example, the control system 82 may be configured to selectively activate portions of the stator coils 34, 40 based on the location of the rotors 22, 24, 26, 28 so that the magnetic fields of the stators 14, 16 attract and/or repel the rotors 22, 24, 26, 28. The control system 82 may be configured to selectively activate a portion of the stator coils 34, 40 proximate to the rotors 22, 24, 26, 28 to attract the rotors 22, 24, 26, 28 toward the group of stator coils 34, 40 in order to move the rotors 22, 24, 26, 28 toward the activated portion of stator coils 34, 40. The control system 82 may be configured to activate portions of the stator coils 34, 40 ahead of the rotors 22, 24, 26, 28 in order to accelerate or maintain a velocity of the chassis 30.

Alternatively or additionally, the control system 82 may selectively active a portion of the stator coils 34, 40 proximate to the rotors 22, 24, 26, 28 to repel the rotors 22, 24, 26, 28 away from the activated portion of stator coils 34, 40 in order to move the rotors 22, 24, 26, 28 away from the activated portion of stator coils 34, 40. The control system 82 may be configured to activate portions of the stator coils 34, 40 behind the rotors 22, 24, 26, 28 in order to accelerate or maintain a velocity of the chassis 30.

To decelerate and/or reverse the direction of the chassis 30, the control system 82 may be configured to selectively activate portions of the stator coils 34, 40 with a different current direction to switch the polarities of the magnetic fields of the activate portions of the stator coils 34, 40. This results in a magnetic force being applied to the rotors 22, 24, 26, 28 in the opposite direction of the movement of the rotors 22, 24, 26, 28.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An electromagnetic propulsion system comprising:
   a first plurality of stator coils wound about a first axis and configured to receive electric current to induce a first magnetic field;
   a plurality of support structures that support the first plurality of stator coils;
   a first coupler that surrounds a portion of the first plurality of stator coils and having a notch oriented so that one of the plurality of support structures can pass through the notch when the first coupler moves along the first plurality of stator coils; and
   a first plurality of rotor coils wound about an axis that is parallel to the first axis, the first plurality of rotor coils being attached to the first coupler and configured to receive electric current to induce a magnetic field that interacts with the first magnetic field so that a magnetic force is applied to the first plurality of rotor coils thereby propelling the first coupler and the first plurality of rotor coils along the first plurality of stator coils.

2. The system of claim 1, further comprising a second plurality of rotor coils wound about an axis that is parallel to the first axis, the second plurality of rotor coils being attached to the first coupler and configured to receive electric current to induce a magnetic field that interacts with the first magnetic field so that a magnetic force is applied to the second plurality of rotor coils.

3. The system of claim 2, the second plurality of rotor coils being positioned on a radially opposite portion of the first coupler than the first plurality of rotor coils.

4. The system of claim 1, further comprising a chassis supported by the first coupler.

5. The system of claim 4, further comprising an energy storage device positioned in the chassis and electrically connectable to the first plurality of rotor coils.

6. The system of claim 4, further comprising—
a second plurality of stator coils wound about a second axis and supported by the plurality of support structures, the second plurality of stator coils being configured to receive electric current to induce a second magnetic field;
a second coupler supporting the compartment and surrounding a portion of the second plurality of stator coils and having a notch oriented so that one of the plurality of support structures can pass through the notch when the second coupler moves along the second plurality of stator coils; and
a second plurality of rotor coils wound about an axis that is parallel to the second axis, the second plurality of rotor coils being attached to the second coupler and configured to receive electric current to induce a magnetic field that interacts with the second magnetic field so that a magnetic force is applied to the second plurality of rotor coils thereby propelling the second coupler and the second plurality of rotor coils along the second plurality of stator coils.

7. The system of claim 4, further comprising a control system configured to control an amount of electric current delivered to the first plurality of rotor coils.

8. The system of claim 7, the control system being operable to reverse a direction of the chassis.

9. The system of claim 4, further comprising—
a coaxial coupler supporting the chassis and surrounding a different coaxial portion of the first plurality of stator coils and having a notch oriented so that one of the plurality of support structures can pass through the notch when the coaxial coupler moves along the first plurality of stator coils; and
a coaxial plurality of rotor coils attached to the coaxial coupler and wound about an axis that is parallel to the first axis, the coaxial plurality of rotor coils being configured to receive electric current to induce a magnetic field that interacts with the first magnetic field so that a magnetic force is applied to the coaxial plurality of rotor coils.

10. The system of claim 1, further comprising a cylindrical housing that houses the first plurality of stator coils and is supported by the plurality of support structures.

11. The system of claim 10, further comprising a bearing system for reducing friction between the first coupler and the cylindrical housing.

12. The system of claim 1, further comprising a control system and a power source, the control system being configured to selectively connect a portion of the first plurality of stator coils to the power source.

13. An electromagnetic propulsion system for transporting a load, the system comprising:
a first plurality of stator coils wound about a first axis and configured to receive electric current to induce a first magnetic field;
a second plurality of stator coils wound about a second axis and configured to receive electric current to induce a second magnetic field;
a plurality of support structures that support the first plurality of stator coils and the second plurality of stator coils;
a first coupler surrounding a portion of the first plurality of stator coils so that the first coupler is movable along the first plurality of stator coils, the first coupler having a notch oriented so that one of the plurality of support structures can pass through the notch when the first coupler moves along the first plurality of stator coils;
a second coupler surrounding a portion of the second plurality of stator coils so that the second coupler is movable along the second plurality of stator coils, the second coupler having a notch oriented so that one of the plurality of support structures can pass through the notch when the second coupler moves along the second plurality of stator coils;
a chassis supporting the load and connected to the first coupler and the second coupler so that the chassis is movable along the first plurality of stator coils and the second plurality of stator coils;
a first plurality of rotor coils attached to the first coupler and wound about an axis that is parallel to the first axis, the first plurality of rotor coils being configured to receive electric current to induce a magnetic field that interacts with the first magnetic field so that a magnetic force is applied to the first plurality of rotor coils, thereby propelling the first coupler and the chassis; and
a second plurality of rotor coils wound about an axis that is parallel to the second axis, the second plurality of rotor coils being attached to the second coupler and configured to receive electric current to induce a magnetic field that interacts with the second magnetic field so that a magnetic force is applied to the second plurality of rotor coils, thereby propelling the second coupler and the chassis.

14. The system of claim 13, further comprising an energy storage device positioned on the chassis and configured to provide electric current to the first plurality of rotor coils and the second plurality of rotor coils.

15. The system of claim 14, further comprising a control system configured to control an amount of electric current provided to the first plurality of rotor coils and the second plurality of rotor coils.

16. The system of claim 13, further comprising—a first coaxial coupler that surrounds a different coaxial portion of the first plurality of stator coils and having a notch oriented so that one of the plurality of support structures can pass through the notch when the first coaxial coupler moves along the first plurality of stator coils;
a second coaxial coupler that surrounds a different coaxial portion of the second plurality of stator coils and having a notch oriented so that one of the plurality of support structures can pass through the notch when the second coaxial coupler moves along the second plurality of stator coils;

a first coaxial plurality of rotor coils wound about an axis that is parallel to the first axis, the first coaxial plurality of rotor coils being attached to the first coaxial coupler and configured to receive electric current to induce a magnetic field that interacts with the first magnetic field so that a magnetic force is applied to the first coaxial plurality of rotor coils, and a second coaxial plurality of rotor coils wound about an axis that is parallel to the second axis, the second coaxial plurality of rotor coils being attached to the second coaxial coupler and configured to receive electric current to induce a magnetic field that interacts with the second magnetic field so that a magnetic force is applied to the second coaxial plurality of rotor coils.

17. The system of claim 13, further comprising—
a third plurality of rotor coils wound about an axis that is parallel to the first axis, the third plurality of rotor coils being attached to the first coupler and configured to receive electric current to induce a magnetic field that interacts with the first magnetic field so that a magnetic force is applied to the third plurality of rotor coils; and
a fourth plurality of rotor coils wound about an axis that is parallel to the second axis, the fourth plurality of rotor coils being attached to the second coupler and configured to receive electric current to induce a magnetic field that interacts with the second magnetic field so that a magnetic force is applied to the fourth plurality of rotor coils.

18. The system of claim 17, further comprising—
a fifth plurality of rotor coils wound about an axis that is parallel to the first axis, the fifth plurality of rotor coils being attached to the first coupler and configured to receive electric current to induce a magnetic field that interacts with the first magnetic field so that a magnetic force is applied to the fifth plurality of rotor coils; and
a sixth plurality of rotor coils wound about an axis that is parallel to the second axis, the sixth plurality of rotor coils being attached to the second coupler and configured to receive electric current to induce a magnetic field that interacts with the second magnetic field so that a magnetic force is applied to the sixth plurality of rotor coils;
wherein the first plurality of rotor coils, the third plurality of rotor coils, and the fifth plurality of rotor coils are radially equidistant from one another on the first coupler; and
wherein the second plurality of rotor coils, the fourth plurality of rotor coils, and the sixth plurality of rotor coils are radially equidistant from one another on the second coupler.

19. An electromagnetic propulsion system for transporting a load, the system comprising:

a first plurality of stator coils wound about a first axis configured to receive electric current to induce a first magnetic field;
a second plurality of stator coils wound about a second axis parallel to the first axis and configured to receive electric current to induce a second magnetic field;
a first cylindrical stator housing made of non-conductive material and enclosing the first plurality of stator coils;
a second cylindrical stator housing made of non-conductive material and enclosing the second plurality of stator coils;
a plurality of support structures that support the first cylindrical stator housing and the second cylindrical stator housing;
a first c-shaped coupler surrounding a portion of the first cylindrical stator housing and having a notch oriented so that one or more of the plurality of support structures can pass through the notch when the first c-shaped coupler travels along the first plurality of stator coils;
a second c-shaped coupler that surrounds a portion of the second cylindrical stator housing and having a notch oriented so that one or more of the plurality of support structures can pass through the notch when the second c-shaped coupler travels along the second plurality of stator coils;
a chassis operable to support the load as the chassis is propelled along the first plurality of stator coils and the second plurality of stator coils;
an energy storage device positioned on the chassis;
a first plurality of rotor sets attached to the first c-shaped coupler and equidistantly spaced on the first c-shaped coupler, each rotor set including a plurality of rotor coils wound about an axis parallel to the first axis and electrically connectable to the energy storage device, the plurality of rotor coils being configured to receive electric current to induce a magnetic field that interacts with the first magnetic field so that a magnetic force is applied to the plurality of rotor coils thereby propelling the chassis; and
a second plurality of rotor sets attached to the second c-shaped coupler and equidistantly spaced on the second c-shaped coupler, each rotor set including a plurality of rotor coils wound about an axis parallel to the second axis and electrically connectable to the energy storage device, the plurality of rotor coils being configured to receive electric current to induce a magnetic field that interacts with the second magnetic field so that a magnetic force is applied to the plurality of rotor coils thereby propelling the chassis.

* * * * *